UNITED STATES PATENT OFFICE.

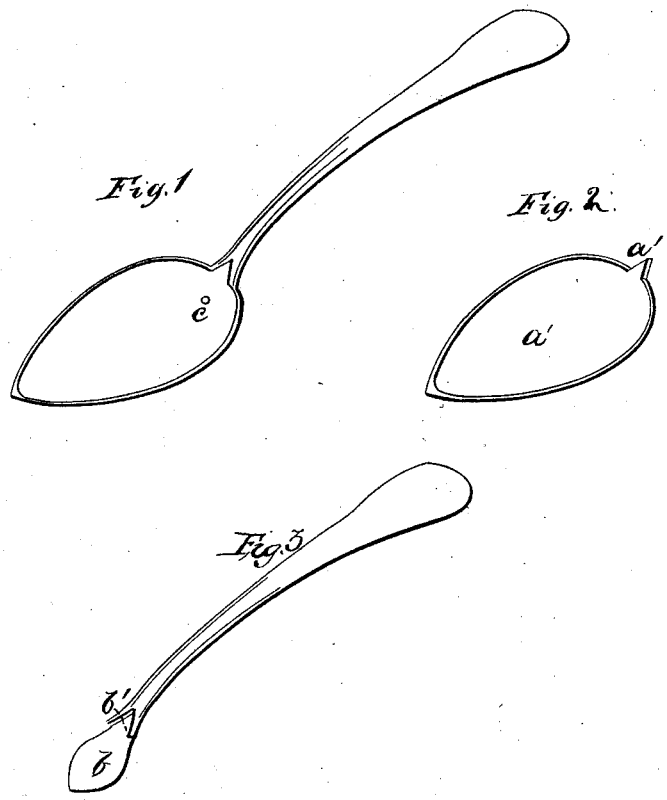

RUSSELL B. PERKINS, OF MERIDEN, CONNECTICUT.

MAKING IRON SPOONS.

Specification of Letters Patent No. 18,517, dated October 27, 1857.

*To all whom it may concern:*

Be it known that I, RUSSELL B. PERKINS, of Meriden, county of New Haven, and State of Connecticut, have invented certain new and useful Improvements in the Manufacture of Metallic Spoons; and I do hereby declare that the following is a full, clear, and exact description of the same, reference being made to the annexed drawing, making a part of this specification, in which—

Figure I represents the spoon as put together. Figs. II and III represent respectively the bowl and the handle as prepared for putting together.

Similar letters indicate similar parts throughout.

The nature of my invention consists in an improved method of joining together the handles and the bowls of metallic spoons, and which said improvements are chiefly applicable to the making of iron spoons. In the manufacture of such spoons the place of joining of the handles and bowls has been heretofore deficient in strength, or if otherwise that place was made clumsy and unsightly besides being more expensive. In my improved method the union of the handles and bowls is accomplished in a ready manner without requiring to be welded, the joint being in fact the strongest part of the spoon. This improvement enables me also to cut and shape the bowls from sheet metal by means of stamps and dies, and to form handles also from wire by the same means. It therefore not only results in reducing the cost but also in the production of a much superior and more sightly article.

The principle of my improvement consists in forming upon that part or edge of the bowl to which the handle is to be attached a tongue or projection; and, when forming the handles, in making in like manner at the end where the bowl is to be joined, a recess fitted to receive this tongue, which when applied is secured by closing the edges over upon the said tongue by a drop and die, or in other suitable manner—the two pieces being thereby so firmly clamped together as to be incapable of separation without rupture, while the extension of the piece called the tongue greatly increases the strength of that part, and which in spoons has been hitherto the first to break.

At ($a$) Fig. II the bowl of a spoon is shown detached from its handle, having at ($a'$) the tongue extending beyond, being beveled at its edges as a dovetail and terminating in a point.

In Fig. III is shown a handle detached and ready for being joined to the bowl. That end to be attached is flattened out, rounded and hollowed to fit the form of the bowl underneath, where it laps over as at ($b$). Above this a V shaped cavity ($b'$) is formed and which is intended to receive the tongue ($a'$) as will be seen in the figures. To join the two together, ($a'$) is to be placed in ($b'$), and the two so placed are then put under a drop press in suitably shaped dies and the edges of ($b'$) closed over the beveled part of ($a'$). The two parts will now be firmly held together, since the tongue ($a'$) can only be drawn out of the handle in the direction of its length, and this is resisted by the part ($b$) of the handle curving under the bowl so far as to prevent such drawing out. For greater strength a rivet may be put through the two as at ($c$) and with but slight addition to the cost.

I shall prefer to make the spoon as follows. The bowl and handle having been formed separately as described, then tin each of those at the part where it is to come into contact with the other. The bowl and handle being now put together, and the cavity closed as before set forth, the finish is given by tinning the whole, and the immersion of it for that purpose in the bath of melted metal effects the soldering of the surfaces in contact, and which had been previously tinned, in a manner well known.

I claim—

As my improvement in the manufacture of spoons, forming the bowl with the tongue ($a'$) and the end of the handle with a cavity fitted to receive said tongue, and then attaching the same together substantially in the manner set forth herein.

RUSSELL B. PERKINS.

Witnesses:
J. H. PIRSSON,
S. H. MAYNARD.